Patented June 16, 1942

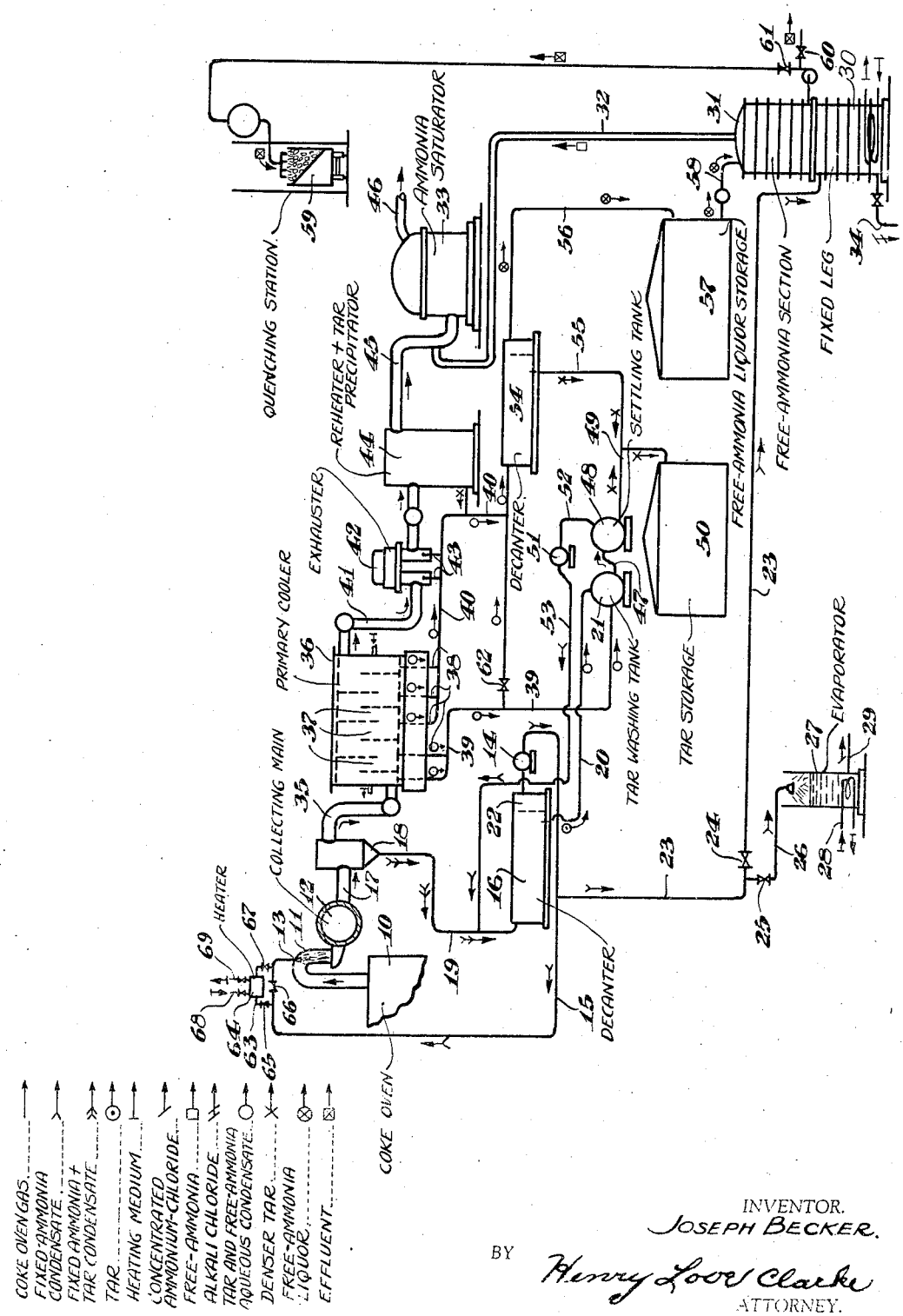

2,286,455

UNITED STATES PATENT OFFICE 2,286,455

COKE-OVEN BY-PRODUCT TAR AND AMMONIA RECOVERY

Joseph Becker, Pittsburgh, Pa., assignor to Koppers Company, Pittsburgh, Pa., a corporation of Delaware Application December 30, 1938, Serial No. 248,396

2 Claims. (Cl. 23—196)

The present invention relates to the recovery of tar and ammonia from gases in which they are simultaneously present and pertains more specifically to their removal and recovery from gases of the type that are produced during the carbonization of coal and the like.

A very substantial part of the chlorine contained in a coal is volatilized therefrom during a carbonization process therefor and is present along with ammonia and tarry constituents in the hot gases leaving the coking chambers and entering the collecting main through their standpipes. This chlorine collects in the liquids condensed from the gases of carbonization and also in liquids employed for their washing and cooling wherein they combine with ammonia to form ammonium chloride which constitutes a substantial proportion of the so-called fixed ammonia content of these liquors.

Tar vapors also present in the distillation gases are simultaneously condensed therefrom in the presence of the aqueous condensates and of the scrubbing liquids which contain both fixed and free ammonium compounds. Separation of the tar from the said condensates and scrubbing liquids is generally effected by subsequent settling and decantation. Such separation by its nature is incomplete and the segregated tar contains dispersed therethrough primarily in suspension small amounts of aqueous solutions containing amongst other constituents ammonium chloride. The tar itself may also contain some suspended ammonium chloride that is not dissolved in the aqueous liquids in consequence of the fact that the greater part of this compound tends to condense in the collecting main at the temperatures generally obtaining there. In subsequent distillation of these tars their content of ammonium chloride is volatilized in the equipment employed and because of a temporary freeing of hydrochloric acid becomes particularly corrosive to metals ordinarily used to fabricate the tar stills.

In applicant's U. S. Patent No. 1,747,616 granted February 18, 1930, there is set-forth a simple and effective method for removing the fixed ammonia content of the distillation gases separately from their free ammonia content. This method comprises maintaining, in the gas cleaning system, the flow of flushing liquor into and the temperature of the collecting main at such levels that substantially the whole of the chloride content of the distillation gases is removed therefrom during their passage through said collecting main and keeping any condensates and scrubbing solutions that have been in contact with gas containing much ammonium chloride separately from those liquors that have been employed to remove free ammonia from the gas or have been in contact with gases containing substantially no other form of ammonia. Thus, according to the improvement described in the above-mentioned patent, the flushing liquor for the collecting main and the therein removed aqueous and tarry constituents of the distillation gases are confined in the gas cleaning system to a portion thereof separate from that for subsequently formed condensates or for a scrubbing solution subsequently employed for removing any remaining tar and the free ammonia. By means of the improvement provided by present applicant's said patent, it is possible to segregate substantially all the ammonium chloride of the distillation gases in a solution that amounts to only about 10 per cent of the total quantity of aqueous condensate and scrubbing liquor used to remove all the tar and the ammonia from the distillation gases. In general, the temperatures maintained in the collecting main are such that the liquors circulated therethrough for cooling, accumulate little of the free ammonia and substantially all the ammonium chloride of the treated gases, and the concentration of the chloride in the washing liquid can be maintained at a level of 10 to 15 per cent by continuously withdrawing from the system such quantities of the condensates and washing liquid as contain that amount of ammonium chloride representing the amount thereof being produced. Amongst the advantages that reside in such a process are the facts that in those instances where it is desirable to produce the salt, ammonium chloride, a strongly concentrated solution thereof becomes automatically available as a starting point and that in those localities where chloride-bearing ammonia-still effluents cannot be discharged into the adjacent water-ways, the amount of such liquor for which special disposal must be provided is greatly reduced.

In the above-described process for separately removing the fixed and free ammonia compounds from gases resulting from the carbonization of carbonaceous material, the tarry constituents also present in said gases are condensed in the presence of the washing solutions and aqueous condensates used for the absorption of both the fixed and the free ammonia compounds, although the preponderance of the tar is condensed in the collecting main; that is, in the presence of an aqueous solution having a high concentration of ammonium chloride. As already hereinbefore stated, the separation of the tarry condensates from the aqueous condensates and washing liquids is continuously carried out by settling and decantation in appropriate equipment and as such separation by its nature is never complete, there results, in the case of the tar removed from contact with the ammonium-chloride-bearing flushing-liquor, a tar having a small content, generally about 2 or 3 per cent by volume, of an aqueous solution that will contain 10 to 15 per cent of ammonium chloride which is highly corrosive to distillation equipment for said tar and which should be removed before treating it in such a process step. This can of course be effected by centrifuging or by a washing with water that is substantially free of chlorides and the like, but the former is expensive and the latter alternative increases the volume of chloride-bearing liquor that must be treated and disposed of.

A principal object of the present invention is therefore the provision of simple and effective means whereby more especially those tars which have been condensed in systems of the described type for separately removing fixed and free ammonia from gases of coal carbonization, and have been segregated from contact with strong solutions of ammonium chloride, can be substantially freed of entrainments of the latter by means that are adapted to be included in a continuous by-product recovery system.

Another object of invention is the provision of means for the stated purpose that will not substantially increase the amounts of ammonia-containing solutions required to be circulated in the coke plant or treated in the free or particularly in the fixed ammonia sections of the ammonia still and will avoid swelling the effluent from the latter section which contains quantities of lime, employed to liberate the fixed ammonia from its salts, combined in the form of for example calcium chloride which in certain localities must be disposed of in a manner not to cause excessive contamination of streams, such, for example, as by evaporation and recovery of the dissolved salts. The invention has for further objects such other improvements and such other operative advantages or results as may be found to obtain in the processes or apparatus hereinafter described or claimed.

According to the present invention, in those gas-cleaning systems where the condensates and other liquids employed for the cooling of, and the recovery of ammonia from, gases and vapors evolved from coal during its carbonization are so employed that the fixed ammonia and the free ammonia are substantially selectively absorbed and collected in separate solutions, those tarry constituents of the gases of carbonization that have been in contact with relatively strong solutions of the fixed ammonia salts and thereafter removed from contact therewith by means providing a somewhat incomplete separation, are subsequently brought into intimate contact with those cooling liquors or condensates containing their ammonia primarily in the so-called free form. In other words, gas liquors in which there is little or substantially no fixed ammonia present are employed as an extraction medium for removing entrained solutions of fixed ammonia salts from tars with which they have been in contact, the result being that the entrained solution of fixed salts is either displaced by those of relatively non-corrosive free ammonia or the residual solution of the former is greatly diluted by the latter and the corrosive effect of such tars during their distillation is greatly diminished, if not entirely eliminated; this advantage results without increase in the amount of ammonia-carrying liquors that must be treated in the coke-oven plant. The extraction is adapted to be carried on continuously and the gas liquor used for the purpose may, if preferred, be used as make-up liquor for the flushing liquor circulated through the collecting main of the battery, in which case the extracted fixed ammonia will be returned to and reconcentrated in the flushing liquor by evaporation, or, the said extraction-liquor can be subsequently evaporated in admixture with fixed ammonia liquor for the recovery of ammonium chloride after neutralization of free ammonia, or, it can be distilled along with the free ammonia liquor, in which latter case the chloride content will be so small that the still residue in most localities will create no particular nuisance if flowed into natural waterways.

In the accompanying drawing forming a part of this specification and showing for purposes of exemplification a preferred method in which the invention may be embodied and practised but without limiting the claimed invention specifically to such illustrative instance or instances, there is illustrated diagrammatically a flow sheet also embodying means whereby the advantages of the present improvement can be simply and effectively realized.

In the drawing:

There is indicated at 10 a coking chamber of a battery of by-product coke ovens and from which coking chamber the hot coke-oven gases and vapors resulting from the carbonization of the oven-charge flow in the direction indicated by the arrow upwards through ascension pipe 11 which thereafter directs them downwardly into collecting main 12 subsequent to their passing in direct contact with a spray of liquor whereby they are cooled, said spray being introduced into the said ascension pipe through spray-nozzle 13 by means of pump 14 and pipe 15 which is fed from the flushing-liquor decanter 16 primarily with condensates previously removed from gases of carbonization by this same cooling step which operates not only to cool but also to condense the major portion of their tar content and most of their fixed salts of ammonia, such as ammonium chloride. The temperature of the distillation gases flowing through collecting main 12 is by this means preferably maintained at such temperature that most of the tar and substantially all of the fixed salts of ammonia are removed therefrom and collect in the therein condensed constituents, thus substantially all the ammonium chloride formed during the distillation of the coal-charge is contained in the commingled tar and aqueous liquors that flow respectively from said collecting main through pipe 17, downcomer 18, and pipe 19 into flushing liquor decanter 16 wherein the said condensates are allowed a period of settling and thereafter the heavier tarry constituents are removed through pipe 20 to tank 21 for collecting and washing tar while the supernatant aqueous constituent decanted into compartment 22 of the flushing-liquor decanter 16 is returned by pump 14 to spray-nozzle 13 to cool further quantities of gas whence it ultimately flows back in said decanter admixed with more tar and containing an increased amount of ammonium chloride in solution. The circulated flushing liquors introduced into the collecting main by the pump 14 can, if preferred, be cooled before entering the standpipes and by means of cooling coils inserted at an appropriate location in the pipe-line 15, such, for example, as a point therealong subsequent to the off-take of branch-line 23 through which such quantity of ammonium chloride as represents production, can be continuously withdrawn from the flushing system and the concentration of salts in the flushing liquor be thus maintained at the desired constant level. When, however, for maintaining preferred operating conditions in the collecting main, it is desirable to heat the circulated flushing liquor, there is provided in the valved branch-pipe 63 of pipe 15, a preferably thermostatically controlled heater 64 whereby the said flushing liquor can be optionally maintained at a higher temperature than it would otherwise have. By opening valves 65, 67, and closing valve 66, the flushing liquor can be sent through said heater 64 where it is brought into indirect contact with a heating medium flowed therethrough by means of inlet and outlet pipes respectively 68, 69.

This spraying of aqueous condensates, previously removed from the gases of carbonization and also containing some unsettled tar, for cooling the hot gases flowed through standpipe 10 causes some of the same to be evaporated but at the same time some water-vapor also to be condensed from said gases as a result of the cooling effect produced by the evaporation. By appropriate regulation of the rates of liquor spraying and of the temperatures in the collecting main, the net result is a substantial removal, at that point, of the tar content of the distillation gases and a substantially complete removal of their fixed ammonia content of which the most of the latter dissolves and becomes concentrated in the aqueous fraction of the recirculated flushing liquor that is returned to the upper part of decanter-tank 16.

A preferred concentration of said fixed salts of ammonia in the circulated flushing liquor is approximately 10 per cent, and this may be automatically maintained by continuously withdrawing from the flushing system, through branch-pipe 23 of pipe 15, that amount of flushing liquor containing the make of fixed ammonia salts which can thereafter be further utilized as preferred. For example, by closing valve 24 of pipe 23 and opening valve 25 of branch-pipe 23, liquor removed from the collecting-main flushing-system can be sprayed into evaporator 27 and boiled by means of indirect steam flowed through heating coils 28 further to concentrate its ammonium chloride content whereupon it can be withdrawn from said evaporator through outlet 29 and be sent to chilling means for precipitating out fixed salts of ammonia and for filtering them from the mother liquor which can thereafter be returned to the flushing system for re-working; or, if preferred, by closing valve 25 and opening valve 24, the withdrawn flushing liquor can be sent further along the pipe 23 to the fixed leg 30 of an ammonial still and there mixed with lime or other alkaline substance and steam distilled for removal of the so liberated ammonia which vaporizes and passes up into the free ammonia section 31 of an ammonia still and thence through outlet line 32 of said section 31 to saturator 33 wherein the gaseous ammonia is fixed in an acid bath.

The solution of alkali-chloride discharged from the bottom of said fixed ammonia section through valved outlet 34 may then be evaporated to recover its content of chlorides in solid form. In volume, this effluent from the fixed ammonia leg will amount to only about 10 per cent of the total aqueous condensate removed from the gases of carbonization during their cleaning and in those localities where special disposition must be provided for all chloride-bearing liquors, it is self-evident that the above-described method of the already mentioned Becker patent for maintaining the liquor for flushing the collecting main separate from other aqueous condensates of the gas-cleaning system reduces the volume of such materials requiring special disposal greatly below those which must be so handled in those cases where all the fixed ammonia and the free ammonia are intermingled and are not separately removed from the distillation gases.

The gases leaving collecting main 12, partially cooled and freed of the greater part of their tar content and of their fixed ammonia, pass by means of pipe 35 into primary cooler 36 where their temperature is still further reduced producing more aqueous condensates which have dissolved therein considerable of the free ammonia content of said gases and only unimportant quantities of fixed ammonia. Primary cooler 36 is, as shown in the drawing, of the type wherein the treated gases are cooled by indirect contact with a cooling medium, although it is apparent that equivalent results can be obtained by direct cooling with, for example, circulated water, and said cooler is provided with a plurality of compartments 37 wherein the aqueous condensates progressively removed from the gases can be separately collected. The condensates separated therein contain in admixture small amounts of the lighter tarry constituents. Each compartment of the said primary cooler is provided with an outlet or drain 38 that may be optionally arranged to flow into the same or a plurality of header pipes, if preferred. In the drawing, the first two compartments discharge into a header-pipe 39 whereas the remainder are arranged to discharge into header-pipe 40.

From primary cooler 36, the cooled distillation gasses pass through pipe 41 into exhauster 42, provided with drain-lines 43 for flowing any condensates accumulating therein into header 40, said exhauster flowing them into the combined reheater and tar precipitator 44 whence they pass into the acid bath contained in saturator 33 through pipe 45. In said saturator, the ammonia passing thereinto from the ammonia still through pipe 32 and also that ammonia contained in the gases of carbonization flowed through said pipe 45 are fixed by the acid of the saturator bath in the form of a salt, and the substantially ammonia-free gases leave the saturator through its outlet-pipe 46 for further disposition.

In consequence of the fact that substantially all of the fixed salts of ammonia in the distillation gases have been removed therefrom during their passage through the collecting main, the ammonia-bearing liquors that are formed in condenser 36 are substantially free of such compounds and their content of ammonia is in the form of so-called free ammonia. Such ammonia is ordinarily not corrosive in distillation equipment. In quantity, such free ammonia liquors amount to about nine times that produced during the separation of the fixed ammonia in the collecting main so that there is adequate volume thereof to be drawn on as a washing or extraction medium for the tar that is condensed in the collecting main in the presence of a strong solution of ammonium chloride and the like.

According to the present invention, the tarry constituents of the distillation gases subsequent to their settling out of the collecting main flushing-liquor in decanter-tank 16, such settling seldom providing a complete separation of the two, are flowed from said decanter into collecting- and washing-tank 21 through pipe 20 with generally 2 to 3 per cent of the flushing-liquor entrained therein. They enter said tank 21 through an aperture in the top thereof. Into the bottom of the said tar-washing tank, as shown in the drawing, there is flowed from the first two of the compartments of cooler 36 the free-ammonia-bearing aqueous condensates collected therein. Due to their differences in gravity the tarry and aqueous condensates tend to respectively flow to the bottom and the top of the washing tank and in so doing are brought into direct intimate contact in a sort of countercurrent flow producing an intermingling such that the entrainments of strong solutions of fixed ammonia salts are either displaced by or greatly diluted with those aqueous condensates from the distillation gases that contain ammonia which is substantially only in the free form. This admixture of tarry and aqueous condensates is then flowed from about the middle level of tank 21 through pipe 47 to settling tank 48 for separating the two constituents, the settled denser tar being thereafter withdrawn through lower outlet pipe therefrom 49 to tar storage 50. The supernatant aqueous layer separated in tank 48, now containing some fixed ammonia salts but in a concentration much less than that present in the collecting main flushing-liquor, can be flowed, if preferred, by pump 51 respectively through lines 52, 53, to decanter-tank 16 where it rejoins the collecting main flushing-liquor and by its evaporation with the heat of the gases of carbonization the fixed ammonia contained therein is again concentrated in said flushing liquor and so recovered. This returning of the tar-washing liquor separated in tank 48 to the flushing system for the collecting main is optional and is not a necessary step of the present improvement. Such a step does however provide a simple and effective means whereby its fixed ammonia content can be recovered cheaply in a concentrated form; however, it will be obvious to those experienced in the art that other treatment of the decanted liquor does not depart from the spirit of the present improvement and that said fixed ammonia liquor can be separately evaporated for the recovery of its fixed ammonia as in evaporator 27, or in the event its ammonia content is desired for recovery in other form, the washing liquor can be treated with an alkaline substance and distilled in the fixed leg 30 of the ammonia still and the effluent therefrom will be relatively low in chlorides and it may in certain localities be introduced into natural waterways without creating an obnoxious situation. The said effluent may also be separately evaporated for the recovery of the chlorides of the alkaline bodies therein.

The step of washing entrained fixed ammonia liquor from tar in tank 21 can be carried out as hereinabove-described by employing the differences in specific gravity of said tar and the free ammonia liquor to effect their necessary intermingling, or they may obviously be agitated together by means of any suitable mechanical mixer or other device for establishing the degree of contact necessary to provide a satisfactory removal of the required amount of the fixed ammonia. Also, a series of washings or extractions may be provided instead of the one washing step hereinabove described and such series of washings may be carried out in continuous operation by supplying an appropriate number of washing tanks, or such result can also be realized in a series of intermittent washings in the single washing tank illustrated in the drawing.

A primary object of the above-described tar-washing step of invention for reducing the chloride content of such tarry constituents of carbonization gases as are collected in the presence of strong solutions of the fixed ammonia salts segregated in a system for separately removing the fixed and the free ammonia constituents from such gases, is to decrease the content of chlorides of said tars sufficiently that they can be distilled in ordinary distillation equipment used for the purpose and without subjecting such equipment to undue corrosion from chlorides and without substantially increasing the volume of aqueous condensates and scrubbing liquors for which subsequent treatment must be provided. A precise statement of the quantity of the free ammonia liquor that must be employed to provide a preferred washing result is impossible because it will be obvious to all experienced in the art that the same will depend on a multiplicity of factors which will vary from application to application, such factors being for example: the concentration of fixed ammonia salts present in the solution thereof entrained in the tar; the extent to which such solution is entrained in said tar, which will in turn depend upon its degree of separation from the solution of fixed ammonia by plant procedure; the manner in which the idea of invention is applied, i. e. whether the washing is performed in a single step or in a series of steps; the resistance of the tar still to chloride corrosion; whether or not complete recovery of fixed ammonia compounds themselves are of particular moment; and, in addition, the amount of chlorides that can be tolerated in the ammonia still effluents as well as the form in which fixed ammonia is recovered. In any event, as hereinbefore mentioned, the volume of free ammonia liquors produced in the cleaning of the gases of carbonization by the hereinabove-mentioned process of present applicant's patent is generally about nine times the production of fixed ammonia liquor, so that there is ample of the former to free the tar produced, by that process, from substantially all entrained fixed ammonia which can itself be still restricted to only a fraction of the total quantity of aqueous liquids produced by the carbonization process.

Referring again to the drawing, the light tar and also aqueous condensates containing substantially only free ammonia removed from the treated gas in the final three compartments of indirect cooler 36 as well as those removed in the exhauster 42 can be flowed respectively through their pipes 38 and 43 into a common header 40 and then into decanter 54 and settled, the therein separated tarry constituents being flowed through pipe 55, as shown by the arrows, into tar-storage tank 50 and before entering which they commingle with the washed tar of the invention flowing from settling tank 48. The free ammonia liquor from decanter 54 can be flowed through pipe 56 into free-ammonia-liquor storage 57 whence it can be sent through line 58 in regulated amounts to the free leg 31 of the ammonia still and distilled for the recovery of its ammonia content. The effluent from 31 can be used to quench coke in coke car 59, without any considerable corrosion of the latter in consequence of its very low, if any, chloride content, by closing valve 60 and opening valve 61, or by conversely adjusting said valves 60, 61, the said effluent can be sent to means for recovering its content of phenolic constituents, or to evaporating means, or any preferred disposition thereof.

As above indicated, the amount of free ammonia liquor employed to wash tar that has been separated from the collecting-main flushing-liquor will vary accordingly as specific plant conditions and as specific results it is desired to bring about, and consequently it will not always be the case that, for example, the quantity of free ammonia liquor produced in any single unit of the gas cleaning apparatus will be precisely that required to yield a preferred operating effect. In consequence of this fact, it is expedient that sources of supply of free amonia liquor should be so interconnected in the carbonization plant that various possible sources of such liquor can be drawn upon when desired. As shown in the accompanying drawing, appropriate adjustment of valve 62 in the pipe with which it is associated enables a plant operator to flow all free ammonia liquor from the first two compartments of cooler 36 to tar-washing tank 21; in the event, however, that the volume of such liquor from this source is more than that required to provide satisfactory washing of the tar in said tank 21, the excess thereof can be sent to decanter 54 through valve 62 and eventually to storage 57; and, on the other hand, if the volume of liquor obtained in the first two compartments is inadequate to remove sufficient of the fixed ammonia compounds from the to-be-washed tar, a fraction of the free ammonia liquor accumulated in the final compartments of said cooler can be diverted from header-pipe 40 into header-pipe 39 through said valve 62, it being of course obvious that these stated operating possibilities depend on the provision of means whereby free ammonia liquor can be optionally flowed in opposite directions through the bridge-pipe that connects pipes 39, 40.

The advantages of the present improvement can be realized by incorporating its features in systems for recovering by-products from gases produced by the carbonization of coal, or the like, no matter whether the semi-direct or the indirect method of ammonia recovery is included within the system employed.

By means of the above-described invention it is possible to effect a more nearly complete segregation, into preferred fractions, of the by-products distilled from a carbonizing coal charge and the improvement is moreover distinguished by its suitability of employment in combination with existing systems for continuous by-product recovery. Advantageously, tar recovered in by-product recovery systems that practise the instant invention can be distilled without serious corrosion to the distillation equipment because corrosion-producing constituents that normally appear therein, have been extracting by means of other condensates from the treated gas wherein said constituents are soluble. An important contribution of the present invention to the art resides in the fact that its advantages are realized without other than that quantity of aqueous liquors normally condensed from or employed for the cleaning of gases derived from the carbonization of coal and the like, and as a result there is no increase in volume of aqueous liquors that must be treated in subsequent operating steps to be disposed of unobjectionably.

The invention as hereinabove set forth is embodied in particular form and manner but may be variously embodied within the scope of the claims hereinafter made.

I claim:

1. In a system for recovery or tar and fixed and free ammonia from hot gases of the carbonization of carbonaceous matter, which comprises separate primary and secondary ammonia removal stages, in which the primary stage involves first partially cooling the hot gases by scrubbing the same with liquor to condense substantially all of only the fixed ammonia from the gas along with tarry constituents and water vapor, with subsequent substantially complete separation of the tar from the fixed ammonia in the scrubbing liquor; and in which the secondary stage involves thereafter separately removing the free ammonia from the gases and further cooling of the gas with maintenance of the ammoniacal condensate of the further cooling of the gas separate from the condensate of the primary stage, and separately treating the ammoniacal liquors from the two stages to recover their ammonia content, and disposing of their waste liquors separately from each other so as to avoid contamination of liquor from the secondary stage with fixed ammonia compounds; the improvement comprising purifying the tar of the primary stage of its residual content of fixed ammonia, after separation from the fixed ammonia liquor, by introducing to the separated tar from the primary stage part of the aqueous ammoniacal liquor from the secondary stage, intimately mixing the two out of contact with the gas being treated, and while being kept separate from the secondary stage, until the fixed ammonia content of the tar from the primary stage is absorbed merely by the intimate mixing of part of the ammoniacal liquor from the secondary stage, and thereafter substantially completely separating said primary stage tar from the intimately mixed ammoniacal liquor from the secondary stage.

2. An improved process as claimed in claim 1 and which includes the step of introducing the secondary stage ammoniacal liquor that is separated from the tar from the primary stage, after having been intimately mixed as aforesaid, into the scrubbing liquor of the primary stage.

JOSEPH BECKER.